United States Patent
Ba et al.

(10) Patent No.: US 10,639,588 B2
(45) Date of Patent: May 5, 2020

(54) GAS FILTERS FOR ACIDIC CONTAMINANTS

(71) Applicant: Serionix, Inc., Champaign, IL (US)

(72) Inventors: Chaoyi Ba, Urbana, IL (US); Weihua Zheng, Savoy, IL (US); Erich Diesel, Champaign, IL (US); James Langer, Urbana, IL (US); James Economy, Urbana, IL (US); Bita Vaezian, Champaign, IL (US); Xinyu He, Urbana, IL (US)

(73) Assignee: Serionix, Inc., Champaign, IL (US)

( * ) Notice: Subject to any disclaimer, the term of this patent is extended or adjusted under 35 U.S.C. 154(b) by 0 days.

(21) Appl. No.: 15/756,041

(22) PCT Filed: Aug. 26, 2016

(86) PCT No.: PCT/US2016/049005
§ 371 (c)(1),
(2) Date: Feb. 27, 2018

(87) PCT Pub. No.: WO2017/040291
PCT Pub. Date: Mar. 9, 2017

(65) Prior Publication Data
US 2019/0022581 A1 Jan. 24, 2019

Related U.S. Application Data

(60) Provisional application No. 62/211,406, filed on Aug. 28, 2015.

(51) Int. Cl.
*B01D 53/40* (2006.01)
*B01D 53/81* (2006.01)
(Continued)

(52) U.S. Cl.
CPC ............ *B01D 53/81* (2013.01); *B01D 53/40* (2013.01); *B32B 27/06* (2013.01); *B32B 27/18* (2013.01);
(Continued)

(58) Field of Classification Search
None
See application file for complete search history.

(56) References Cited

U.S. PATENT DOCUMENTS 3,510,386 A   5/1970   Goins et al.
4,534,775 A   8/1985   Frazier
(Continued)

FOREIGN PATENT DOCUMENTS

CN   103099310 A   5/2013
JP   S6312315 A    1/1988
(Continued)

OTHER PUBLICATIONS

International Search Report and Written Opinion of international application PCT/US2016/049005, dated Jan. 23, 2017, 19 pgs.
(Continued)

*Primary Examiner* — Walter D. Griffin
*Assistant Examiner* — Jelitza M Perez
(74) *Attorney, Agent, or Firm* — Eversheds Sutherland (US) LLP

(57) ABSTRACT

An example article includes a substrate and a coating applied to the substrate. The coating may include a basic reactant and a humectant. The coating may further include a preservative or a water-soluble polymer. A coating configured to be applied to an acidic gas filter substrate may include $K_2CO_3$, potassium succinate, dehydroacetic acid, and poly(2-acrylamido-2-methyl-1-propanesulfonic acid (PAMPS). An example system includes an acidic gas filter
(Continued)

including a coating, and a sensor configured to sense an optical change in the coating.

25 Claims, 14 Drawing Sheets

(51) Int. Cl.
| | | |
|---|---|---|
| *B32B 27/20* | (2006.01) | |
| *B32B 27/06* | (2006.01) | |
| *B32B 27/18* | (2006.01) | |
| *C08K 3/34* | (2006.01) | |
| *C09D 181/00* | (2006.01) | |
| *C08K 3/22* | (2006.01) | |

(52) U.S. Cl.
CPC .............. *B32B 27/20* (2013.01); *C08K 3/346* (2013.01); *C09D 181/00* (2013.01); *B01D 2251/2065* (2013.01); *B01D 2251/604* (2013.01); *B01D 2251/606* (2013.01); *B01D 2257/302* (2013.01); *B01D 2257/304* (2013.01); *B01D 2257/306* (2013.01); *B01D 2257/504* (2013.01); *B32B 2255/00* (2013.01); *B32B 2255/02* (2013.01); *B32B 2535/00* (2013.01); *C08K 3/22* (2013.01)

(56) References Cited

U.S. PATENT DOCUMENTS

| | | | |
|---|---|---|---|
| 4,547,350 A | 10/1985 | Gesser | |
| 4,552,767 A | 11/1985 | Saleeb et al. | |
| 4,892,719 A | 1/1990 | Gesser | |
| 5,492,683 A | 2/1996 | Birbara et al. | |
| 5,626,820 A | 5/1997 | Kinkead et al. | |
| 5,783,608 A | 7/1998 | Sugo et al. | |
| 5,830,414 A | 11/1998 | Ishii et al. | |
| 5,944,878 A | 8/1999 | Curt | |
| 6,009,739 A | 1/2000 | Kunio et al. | |
| 6,071,479 A * | 6/2000 | Marra | B01D 53/025 422/122 |
| 6,187,596 B1 | 2/2001 | Dallas et al. | |
| 6,228,135 B1 | 5/2001 | Sugo et al. | |
| 6,447,584 B1 | 9/2002 | Oleg et al. | |
| 6,451,423 B1 | 9/2002 | Armat et al. | |
| 6,706,361 B1 | 3/2004 | Economy et al. | |
| 6,802,891 B2 | 10/2004 | Kritzler | |
| 6,872,241 B2 | 3/2005 | Soane et al. | |
| 7,022,158 B2 | 4/2006 | Seguin et al. | |
| 7,025,809 B2 | 4/2006 | Chen et al. | |
| 7,029,516 B2 | 4/2006 | Campbell et al. | |
| 7,052,533 B2 | 5/2006 | Nakahara et al. | |
| 7,232,475 B2 | 6/2007 | Kritzler | |
| 7,341,618 B2 | 3/2008 | Bayer et al. | |
| 7,427,409 B2 | 9/2008 | Gooch et al. | |
| 7,442,237 B1 | 10/2008 | Gardner | |
| 8,211,218 B2 | 7/2012 | Dallas et al. | |
| 8,221,712 B2 | 7/2012 | Vorberg et al. | |
| 8,293,333 B2 | 10/2012 | Croll et al. | |
| 2003/0069378 A1 | 4/2003 | Sanduja et al. | |
| 2003/0116022 A1 | 6/2003 | Kritzler et al. | |
| 2004/0020367 A1 * | 2/2004 | Soane | B01D 46/0001 96/226 |
| 2004/0250683 A1 | 12/2004 | Soane et al. | |
| 2005/0092176 A1 | 5/2005 | Ding et al. | |
| 2005/0126393 A1 | 6/2005 | Chen et al. | |
| 2005/0132886 A1 | 6/2005 | Schultze et al. | |
| 2006/0042209 A1 | 3/2006 | Dallas et al. | |
| 2006/0042210 A1 | 3/2006 | Dallas et al. | |
| 2006/0097223 A1 | 5/2006 | Powers et al. | |
| 2006/0130451 A1 | 6/2006 | Ding et al. | |
| 2006/0231487 A1 | 10/2006 | Bartley et al. | |
| 2007/0065951 A1 | 3/2007 | Soldatov et al. | |
| 2008/0026025 A1 | 1/2008 | Gooch et al. | |
| 2010/0018396 A1 | 1/2010 | Ding et al. | |
| 2010/0233048 A1 | 9/2010 | Dallas et al. | |
| 2014/0205505 A1 | 7/2014 | Kirollos et al. | |
| 2014/0298996 A1 * | 10/2014 | Meirav | B01D 53/04 96/154 |
| 2015/0107203 A1 | 4/2015 | Ichikawa et al. | |

FOREIGN PATENT DOCUMENTS

| | | | |
|---|---|---|---|
| JP | H0360710 A | 3/1991 | |
| JP | H0360711 A | 3/1991 | |
| JP | 03161020 A | 7/1991 | |
| JP | H03161020 A | 7/1991 | |
| JP | 2002028427 A | 1/2002 | |
| JP | 2003275530 A | 9/2003 | |
| WO | 09745189 A1 | 12/1997 | |
| WO | 1997045189 A1 | 12/1997 | |
| WO | 0010687 A1 | 3/2000 | |
| WO | 2000010687 A1 | 3/2000 | |
| WO | 0170391 A1 | 9/2001 | |
| WO | 2001070391 A1 | 9/2001 | |
| WO | 2005032608 A1 | 4/2005 | |
| WO | 2006026517 A1 | 3/2006 | |
| WO | WO-2012158911 A2 * | 11/2012 | ........... B01D 53/025 |
| WO | 2015103593 A1 | 7/2015 | |

OTHER PUBLICATIONS

Strommen et al., "The Trapping of Indoor Air Contaminants," Central European Journal of Chemistry, vol. 9, No. 3, Feb. 22, 2011, pp. 404-409.

Lobert et al., "Optimize Semiconductor HVAC Filtration Through Evaluation," Solid State Technologies, retrieved from http://electroiq.com/blog/2008/09/optimize-semiconductor-hvac-filtration, Mar. 16, 2018, 8 pages.

Muller et al., "Solving Air Containment Problems in Data Centers," Uptime Institute, retrieved from https://journal.uptimeinstitute.com/solving-air-contaminant-problems-data-centers/, Mar. 16, 2018, 17 pp.

"AAF's Air Filter Solutions for Museums," AAF International, retrieved from https://web.archive.org/web/20160728014918/http://www.aafeurope.com/en/38/museums, Mar. 29, 2018, 3 pages.

International Preliminary Report on Patentability from International Application No. PCT/US2016/049005, dated Mar. 15, 2018, 14 pp.

* cited by examiner

Bromothymol Blue

Neutral Red

Phenol Red

Bromocresol Purple

GAS FILTERS FOR ACIDIC CONTAMINANTS

This application is a national stage application under 35 U.S.C. § 371 of International Application number PCT/US2016/049005, filed Aug. 26, 2016, which claims the benefit of U.S. Provisional Application No. 62/211,406, filed Aug. 28, 2015, each of which are incorporated herein by reference in their entirety.

TECHNICAL FIELD

The present disclosure generally relates to articles and systems for filtering acidic contaminants from a gas.

BACKGROUND

Acidic gases in air may cause many problems. Airborne molecular contaminants (AMCs) such as trace acids (e.g. $SO_2$) in microelectronics environment (for example, a semiconductor cleanroom) may corrode the surface or cause haze through acid-base combinations. In museums, art galleries, or libraries, acidic gases may cause corrosion or blackening of artifacts including metals, marble, calcium carbonate, limestone, cellulose (paper, cotton, linen, etc.), paintings, and silk. In data centers located in areas with high ambient air pollution, electronic equipment such as circuit boards with metal traces) can experience corrosion related hardware failures.

SUMMARY

In general, the present disclosure describes example articles and techniques for filtering acidic contaminants from a gas, for example, air.

In an example, the disclosure describes an example article including a substrate, and a coating applied to the substrate. The coating includes a basic reactant and a humectant.

In an example, the disclosure describes an example article including a substrate, and a coating applied to the substrate. The coating includes a basic reactant, a humectant, a preservative, and a water-soluble polymer.

In an example, the disclosure describes an example coating configured to be applied to an acidic gas filter substrate. The coating includes $K_2CO_3$, potassium succinate, dehydroacetic acid, and poly(2-acrylamido-2-methyl-1-propanesulfonic acid (PAMPS).

In an example, the disclosure describes an example article including a substrate and a coating applied to the substrate. The coating may include a basic reactant, a cross-linkable polymer, a cross-linker, a stabilizer, a preservative, and a color-changing dye.

In an example, the disclosure describes an example article including a fibrous substrate and a coating applied to the fibrous substrate. The coating may include a cross-linkable polymer and a cross-linker that form an ionic gel.

In an example, the disclosure describes an example system including an acidic gas filter comprising a coating on a substrate. The example system includes a sensor configured to sense an optical change in the coating.

The details of one or more aspects of the invention are set forth in the accompanying drawings and the description below. Other features, objects, and advantages of the invention will be apparent from the description and drawings, and from the claims.

BRIEF DESCRIPTION OF DRAWINGS

The foregoing and other aspects of this invention are made more evident in the following Detailed Description, when read in conjunction with the attached Drawing Figures, wherein.

DETAILED DESCRIPTION

Acidic contaminants may be removed from a gas, for example, air or an enclosed atmosphere using air filtration systems that may be part of (heating, ventilation, and air conditioning (HVAC) systems. Systems for removing acidic contaminants from gases or air may include a chemical filter that includes strong base ion-exchange resins, activated carbon, or base-impregnated activated carbon, or their mixtures. However, known systems and techniques may not exhibit sufficient capacity, may not be stable over relatively longer time periods, and may be expensive, among other disadvantages.

Example articles according to the present disclosure may provide advantages such as a higher capacity for removal of bases at low concentration ranges, maintaining baseline performance for a longer time (better breakthrough performance), better mass transfer within the working conditions provided by the efficiency of contact, lower costs, lower carbon or energy footprint, and an indication of remaining filter life or of filter failure.

Figure 1A:
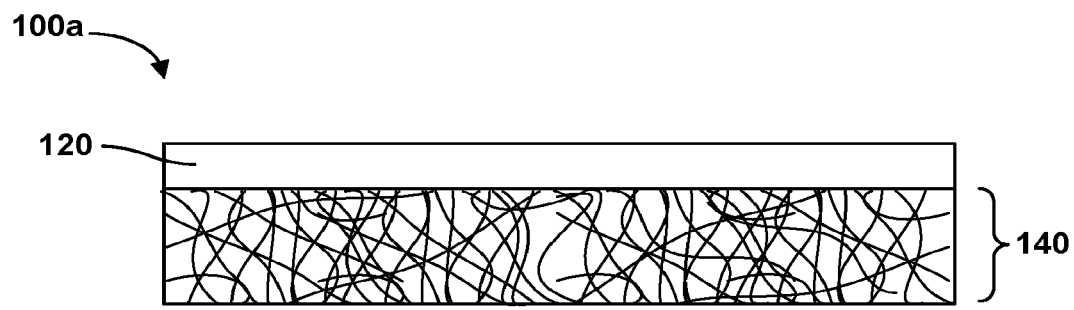
FIGS. 1A-1C are conceptual diagrams illustrating a cross sectional view of an example article for filtering acidic contaminants from a gas.
Figure 1B:
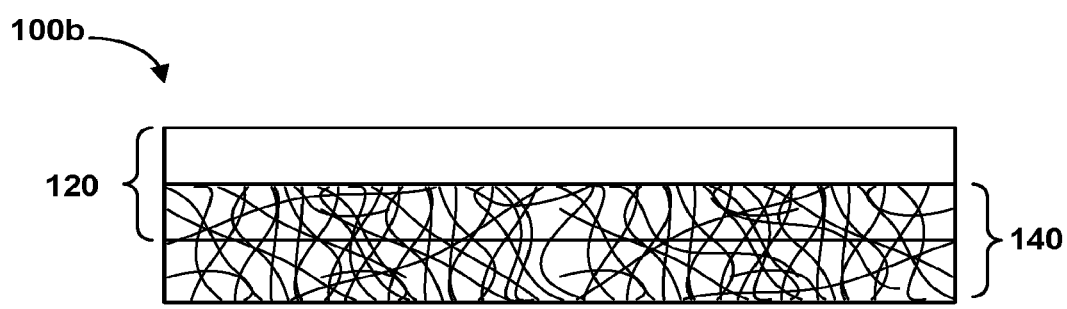
Figure 1C:
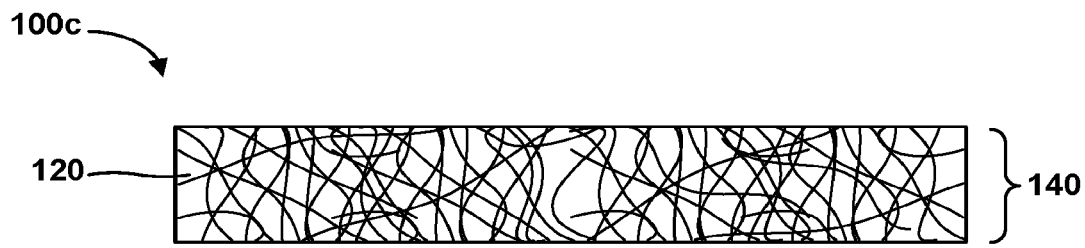

FIGS. 1A-1C are conceptual diagrams illustrating a cross sectional view of an example article for filtering acidic contaminants from a gas. As shown in FIG. 1A, an example article 100a includes a substrate 140, and a coating 120 applied to substrate 140. Coating 120 may include a basic reactant and a humectant. In examples, the humectant may be present in a weight ratio of from about 1:20 to about 1:1 with respect to the basic reactant. The basic reactant may attract acid gas molecules and react with them, resulting in their capture, filtration, absorption, adsorption, or otherwise, removal from the air surrounding the article 100a. In examples, the basic reactant includes at least one of $K_2CO_3$, $Na_2CO_3$, $Cs_2CO_3$, $KHCO_3$, $NaHCO_3$, $CsHCO_3$, NaOH, KOH, CsOH, choline hydroxide, choline carbonate, or hydroxides, carbonates or bicarbonates of quaternary ammonium compounds. $Cs_2CO_3$ or $CsHCO_3$ can work at low relative humidity due to their strong capability to absorb moisture from air. However, they may have a low relative mass capacity for acid removal because of their high molecular weights. They also may be unsuitable for use at high relative humidity as they may absorb a significant amount of water. $Na_2CO_3$ may not work well at ambient conditions due to its low solubility and high critical relative humidity (for example, 92% at 20° C.). KOH may be corrosive to some substrates and will eventually convert to $KHCO_3$ by absorbing $CO_2$. Choline and quaternary compounds may provide adequate performance but each tends to emit trimethylamine or other odorous amines which may themselves present problems in the use environment. Considering the capacity, cost and required working conditions, $K_2CO_3$ or $KHCO_3$ are preferred for acid removal. The concentration of basic reactants such as $K_2CO_3$ or $KHCO_3$ may affect the rigidity of a fibrous substrate, and may be adjusted to impart a predetermined rigidity to the substrate.

The humectant may attract moisture from air and maintain a certain amount of water in the coating. The humectant may include at least one salt comprising formate, acetate, nitrite, citrate, succinate, fluoride, fluoride, glycolate, ascorbate, malonate, tartarate, gluconate, fumarate, sorbate, lactate, iminodiacetate, and malate. The salt may include a sodium, potassium, or cesium salt. For example, the humectant may include one or more of potassium formate, potassium acetate, potassium nitrite, potassium citrate, potassium succinate, potassium fluoride, cesium fluoride, potassium glycolate, potassium ascorbate, potassium malonate, potassium tartarate, potassium, gluconate, potassium fumarate, potassium sorbate, potassium lactate, potassium iminodiacetate, or potassium malate. Each humectant has a certain critical relative humidity (i.e., the humidity at which the substance will self-saturate with water). For removal of acid gas contaminants such as sulfur dioxide, potassium succinate may be preferred. Without being bound by theory, potassium succinate may improve the mass transport between gas/liquid and liquid/solid interfaces. For applications sensitive to volatile organic acids, salts whose conjugate acids are volatile, for example, potassium acetate, should be avoided as humectants, as the conjugate acid may have a tendency to volatilize once the pH drops to the neutral range.

In examples, coating 120 may further include a preservative. The preservative may protect the filter from attack by bacteria, fungi or other microorganisms, and thus promote the lifetime of the filter. In examples, the preservative may include potassium iodide, potassium nitrite, polyols, parabens, benzoates, dehydroacetic acid, or combinations thereof. It is believed potassium iodide may be slowly oxidized into triiodide, which is a safe and effective bactericidal material. Preferably, the preservative may include dehydroacetic acid. Nitrite may also be effective, but has the drawback that its conjugate acid nitrous acid is volatile. In examples, the preservative may include nitrite salts. In examples, the preservative may be present in a weight ratio of from about 1:5000 to about 1:10 with respect to the basic reactant.

In examples, coating 120 may further include a water-soluble polymer. Since the coating contains a certain amount of water, which may promote reaction between acids to be removed and the basic reactant, the coating may not be stable due to the flowing and drifting of the liquid solution. A water-soluble polymer may be used to increase the viscosity of the liquid phase to stabilize the coating on the fiber, and possibly to contribute to neutralizing acidic components from the gas. For example, increasing the viscosity may reduce flow or drifting of coating 120. A chemically stable water-soluble polymer is preferred. In examples, the water-soluble polymer may include polyelectrolytes. The water-soluble polymer may include one or more of group 1 metal polyacrylates, PAA-potassium, polyvinyl alcohol (PVA), polyacrylamide (PAM), poly(ethylene glycol) (PEG), polydiallyldimethylammonium chloride (PDADMAC), poly(3-acrylamidopropyltrimethylammonium chloride) (PAPTMAC), polymaleic acid, polyethylenimine (PEI), ethoxylated polyethylenimine (EPEI), poly(vinyl amine) (PVAm, Lupamine 9095), poly(2-acrylamido-2-methyl-1-propanesulfonic acid (PAMPS), poly(sulfonic acids), poly (phosphonic acids), poly(N-hydroxyethyl acrylamide) (PN-HEA), polymers of NHEA, a polymer comprising carboxylic acid monomers, or copolymers comprising monomers of any of the aforementioned polymers. In some examples, the polymer may include repeat units including carboxylic acids or carboxylate, for example, poly(acrylic acid), carboxymethylcellulose, or alginic acid. In some examples, the water-soluble polymer includes PAMPS. PAMPS may be synthesized with a good control of molecular weight in a range of 0.8-15 million. A high molecular weight is desired to stabilize the coating. However, too high molecular weight may lead to very high viscosity of the coating solution and poor processability. A molecular weight between about 5 and about 10 million is preferred. In some examples, a molecular weight of less than 5 million, for example, about 1 million, or less than about 1 million, may be used.

In examples, the water-soluble polymer is present in a concentration between about 0.2 and about 20% by weight with respect to the coating. Cross-linkable polymers may be used so that once cross-linked by thermal, chemical or photo methods, the coating materials may be fixed and thus stabilized onto the substrate. By this approach, drifting of the coating materials at high relative humidity environments over time can be prevented. Cross-linkable polymers may include poly(N-hydroxylmethylacrylamide) (PNHMA), poly(N-hydroxylmethylacrylamide-co-2-acrylamido-2-methyl-1-propanesulfonic acid) (PNHMA/PAMPS), poly (N-hydroxylmethylacrylamide-co-3-acrylamidopropyltrim-ethylammonium chloride) (PNHMA/PAPTMAC), poly (diacetone acrylamide) (PDAAM), poly(diacetone acrylamide-co-2-acrylamido-2-methyl-1-propanesulfonic acid) (PDAAM/PAMPS), and poly(diacetone acrylamide-co-diallyldimethylammonium chloride) (PDAAM/PDAD-MAC). The copolymers may contain 5 to 30 wt % of cross-linkable component, e.g. PNHMA or PDAAM. PNHMA can be cross-linked at high temperature. PDAAM can form a cross-linked hydrogel with adipic acid dihydrazide (ADH). PNHMA and PDAAM/PAMPS may form stable cross-linked structure at elevated temperatures. Biopolymers may also be used to form a cross-linking structure by thermal, chemical, ionical and photo methods. Such biopolymers may include one or more of alginate, humic acid, modified celluloses, starches, modified starches, xanthan gum, chitosan and chitin. Multivalent cations, for example, calcium, magnesium, zinc, aluminum, copper, barium, ferric, ferrous, cobalt, and nickel, may be included to act as ionic cross-linkers to form a strong gel. For example, alginate can immediately form gel in the presence of calcium chloride. In order to stabilize the gel particles, some antiscalants such as amino trimethylene phosphonic acid (ATMP) and 1-hydroxy ethylidene-1,1-diphosphonic acid (HEDP) may be added. Solution viscosity may need to be adjusted by high molecular weight polymers such as xanthan gum, hydroxypropyl cellulose (HPC), carboxymethyl cellulose (CMC), and polyvinyl alcohol.

In examples, coating 120 may include a pH indicator. pH indicators may help indicate breakthrough of the article 100a because coating 120 may exhibit a pH change as it progressively captures acidic gas components such as $SO_2$. Preferably, a pH indicator should have a stable and bright color during storage and a sharp and apparent color change at a predetermined change in pH that may correspond to parameters such as, for example, remaining capacity of the article 100a or concentration of acid breaking through the filter. The pH indicator should preferably not negatively impact the filter performance. In examples, the pH indicator may be uniformly dispersed through coating 120. In examples, the pH indicator is disposed within a predetermined volume or region of coating 120. For example, the pH indicator may be disposed within a volume of the coating having a square, circular, oval, rectangular, or any other suitable surface area boundary. In examples, the pH indicator comprises at least one of thymol blue, bromothymol blue, nitrazine yellow, lacmoid, 2,6-dichlorophenol indophenol, bromophenol blue, bromocresol green, bromocresol purple, chlorophenol red, bromophenol red, brilliant yellow, cresol red, curcumin, phenol red, alizarin, alizarin red S, congo red, neutral red, methyl orange, methyl red, meta-cresol purple, and 2-(4-dimethylaminophenylazo)pyridine. Chlorophenol red, phenol red, brilliant yellow, cresol red are preferred due to their relatively high stability, proper pH change range, bright colors and sharp color change at breakthrough.

Substrate 140 may include a woven, nonwoven, foam, porous, solid, or any other suitable substrate. In examples, substrate 140 may include one or more of fibers, granules, beads, monoliths (for example, carbon monoliths, or inorganic monoliths such as clay monoliths), or powders. As shown in FIG. 1A, in an example article, substrate 140 may include a fibrous substrate. In examples, the substrate includes at least one of a non-woven web, glass fiber, paper, polymer, activated carbon, textile, cellulosic fiber, and cotton. In examples, substrate 140 may allow a flowing gas to pass through a major surface of substrate 140. In examples, substrate 140 may allow a flowing gas to pass along a major surface. In some examples, substrate 140 may include one or more of a pleated sheet, an array of sheets, a packed bed, a honeycomb structure, or a flat sheet.

In the example shown in FIG. 1A, coating 120 may be disposed on a major surface of substrate 140. However, as shown in FIG. 1B, an example article 100b may include a coating 120 that at least partly impregnates substrate 140. For example, coating 120 may enter and occupy a volume within a bulk region of substrate 140. Coating 120 may be impregnated into substrate 140. Substrate 140 may be wetted with a coating composition, or with separate solutions of each component of the composition which may wick into the support, followed by removal of the solvent (typically, water). The solvent may be removed, and preferably, is substantially completely removed after substrate 140 is impregnated with coating 120. In an example, as shown in FIG. 1C, an example article 100c may include a coating 120 that impregnates a substantial bulk of substrate 140. For example, in examples where substrate 140 includes a fibrous substrate, coating 120 may completely penetrate the bulk of substrate 140, and may coat surfaces of fibers of the fibrous substrate. In examples, coating 120 may at least coat surfaces of fibers of the fibrous substrate.

In examples, coating 120 may include a basic reactant, a cross-linkable polymer, a cross-linker, a stabilizer, a preservative, and a color-changing dye. In examples, the stabilizer may include water-soluble polymers described with reference to FIGS. 1A-1C. In examples, coating 120 may include a cross-linkable polymer and a cross-linker that form an ionic gel. In examples, coating 120 may further include $K_2CO_3$, potassium succinate, dehydroacetic acid, and poly (2-acrylamido-2-methyl-1-propanesulfonic acid) (PAMPS). In examples, coating 120 further may further include a color changing dye including one or more of phenol red, bromophenol red, cresolphenol red, and brilliant yellow. In examples, the cross-linkable polymer may include alginate, and the cross-linker may include calcium chloride.

Figure 2A:
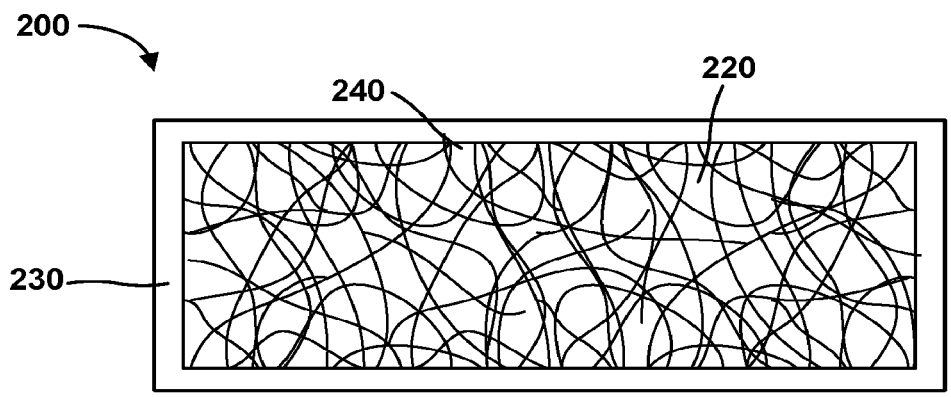
FIG. 2A is a conceptual diagram illustrating a top view of an example acidic gas filter for filtering acidic contaminants from a gas.

FIG. 2A is a conceptual diagram illustrating a top view of an example acidic gas filter for filtering acidic contaminants from a gas. In an example, an acidic gas filter 200 includes a frame 230 holding a substrate 240. A coating 220 is disposed on at least a major surface of substrate 240. Substrate 240 may include substrate 140 described above with reference to FIG. 1A. Coating 220 may include coating 120 described above with respect to FIG. 1A. Acidic components may be extracted, removed or filtered from air by passing air across or along a surface of the acidic gas filter 200. Coating 220 may interact with, for example, attract, react, or otherwise capture, acidic gas components from air. Acidic gas filter 200 may be used in HVAC systems, personal ventilation systems, air or gas filtration systems, masks, or any other system or application for removal of acidic contaminants from a gas. In examples, substrate 240 may include a label. For example, coating 220 applied to substrate 240 may together form a label. The label may undergo a visual or optical change upon sufficient exposure to a gas including acidic contaminants. The label may be separate from or integrated with a primary filtration medium of acidic gas filter 200.

Figure 2B:
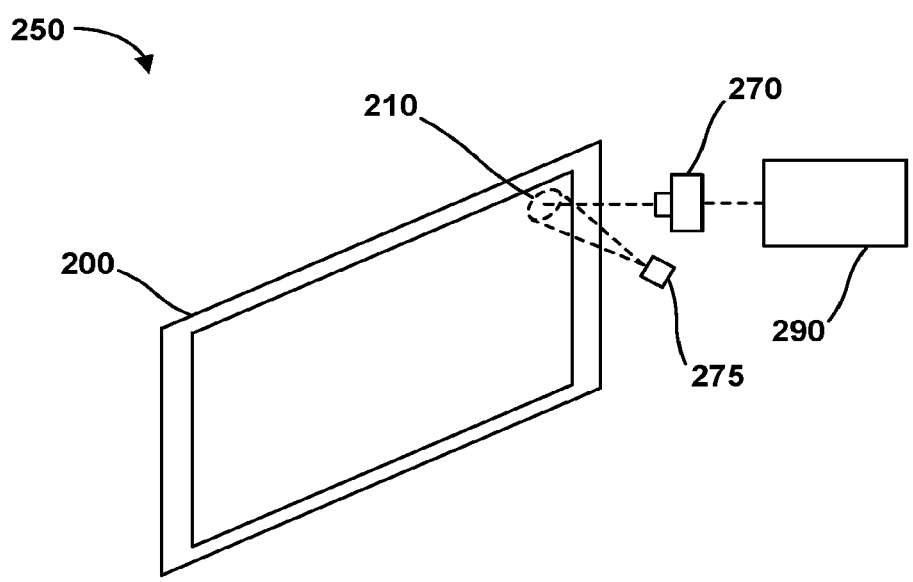
FIG. 2B is a conceptual diagram illustrating an example system including an example acidic gas filter, and a sensor.

FIG. 2B is a conceptual diagram illustrating an example system 250 including acidic gas filter 200 for filtering acidic contaminants from a gas and a sensor 270. In examples, sensor 270 may include one or more of an optical sensor, a light sensor, an image sensor, or a camera, a charge coupled device (CCD), photovoltaics, photodiodes, and complementary metal-oxide semiconductor (CMOS), and may sense an optical property of a region 210 of acidic gas filter 200. In some examples, the optical property may include one or more of color, hue, saturation, intensity, reflectivity, appearance, refractive index, absorbance, fluorescence, and/or phosphorescence, or other suitable optical property of acidic gas filter 200 that may be indicative of a status of acidic gas filter 200. In some examples, sensor 270 may sense one or more of x-ray, ultraviolet, visual, near-infrared, or infrared wavelengths. In some examples, system 250 may include a source 275 that may emit one or more of x-ray, ultraviolet, visual, near-infrared, or infrared wavelengths over region 210 of acidic gas filter 200. In some examples, a light ray emitted by source 275 may interact with, for example, by one or more of complete or partial reflection, refraction, absorption, diffusion with acidic gas filter 200, and sensor 270 may sense light originating from source 270 after the light interacts with acidic gas filter 200. In some examples, sensor 270 may sense a color change of a pH indicator in acidic gas filter 200. In some examples, sensor 270 may generate a signal indicative of an optical change in acidic gas filter 200, for example, a color change.

In some examples, source 275 may include one or more of sunlight, incandescent, halogen, fluorescent, light-emitting diode, organic light-emitting diode, laser, or a combustion source. In some examples, one or both of sensor 270 and source 275 may be powered by a power source, for example, AC or DC power source, batteries, photovoltaics, piezoelectric devices, fuel cells, capacitors, turbine-driven generators, radio- or microwave-frequency energy harvesters, thermoelectrics, or a combination thereof. In some examples, system 250 may not include source 275, and sensor 270 may sense ambient light interacting with region 210 of acidic gas filter 200.

In some examples, system 250 may include a computing device 290. Computing device 290 may receive signals generated by sensor 270 by sensing region 210 that may be indicative of a status of acidic gas filter 200. Sensor 270 may send signals to computing device 290 may a wired or wireless connection, for example, through a wire, cable, fiber optic, or other communication medium, or by a wireless communication protocol, for example, WiFi, Bluetooth, or other suitable wireless communication. In some examples, system 250 may not include a separate computing device, and instead, computing device 290 may be integrated in sensor 270. Computing device 290 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, computing device 290 may be remote from acidic gas filter 200 and sensor 270. In some examples, computing device 290 may execute modules to analyze signals received from sensor 270 to determine the status of acidic gas filter 200. In some examples, computing device 290 may output a signal indicative of a status of acidic gas filter 200. In some examples, sensor 270 may analyze the sensed signals, and output a signal indicative of a status of acidic gas filter 200. The signal indicative of the status may include one or more of a visible or audible alert, for example, a light, an icon, an alert tone, an alert message, or a digital communication encoding the status.

Figure 2C:
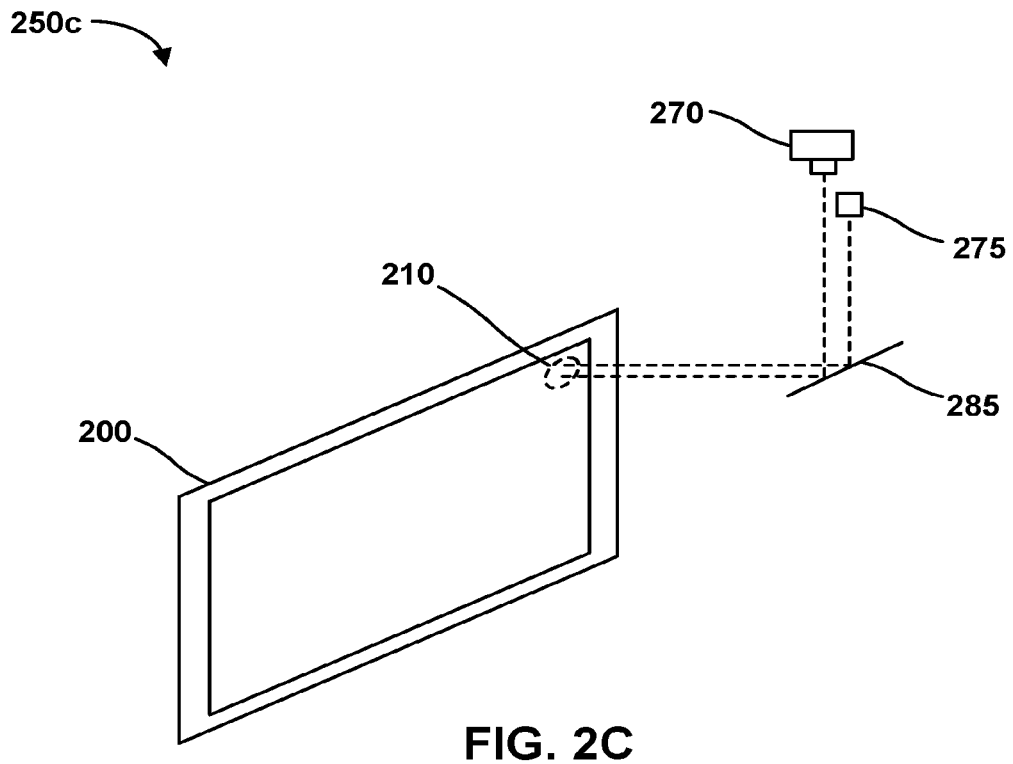
FIG. 2C is a conceptual diagram illustrating an example system including an example acidic gas filter, a sensor, and an optical element.

While in the example of FIG. 2B, source 275 and sensor 270 are adjacent the same surface of acidic gas filter 200, in other examples, source 275 and sensor 270 may be disposed adjacent opposite surfaces of acidic gas filter, so that sensor 270 detects light transmitted through or across acidic gas filter 200. In some examples, one or both of source 270 or sensor 275 may have a direct line of sight to region 210. In some examples, one or both source 270 or sensor 275 may have an indirect line of sight to region 210, for example, through an optical path that may be deflected by one or more optical elements. FIG. 2C is a conceptual diagram illustrating an example system 250c including acidic gas filter 200 for filtering acidic contaminants from a gas, sensor 270, and an optical element 285. As shown in FIG. 2C, one or both of source 275 and sensor 270 may have an indirect line of sight to region 210 through optical element 285. In some examples, optical element 285 may include one or more of a mirror, a prism, a diffraction grating, or an optical filter.

In some examples, region 210 may be static or dynamic. For example, one or both of source 275 or sensor 270 may move or reposition, for example, by a motor or other displacement mechanism to sense different regions of acidic gas filter 200. In some examples, region 210 may include a portion of a surface of acidic gas filter 200. In some examples, region 210 may include substantially an entire surface of acidic gas filter 200.

In some examples, the optical property may be indicative of filter status, for example, one or more of saturation, breakthrough, contamination, capacity, presence or absence of one or more predetermined chemical species in acidic filter 200 that may have been absorbed from air, or amount of a chemical or contaminant removed by acidic gas filter 200.

Figure 2D:
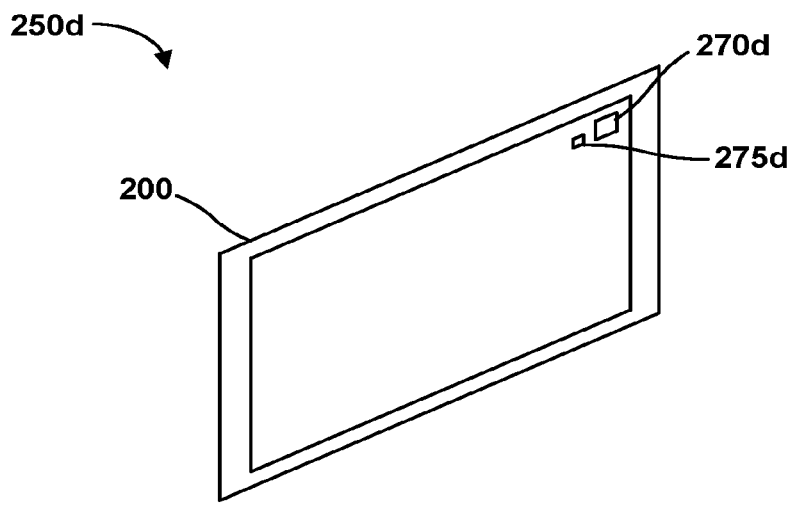
FIG. 2D is a conceptual diagram illustrating an example system including an example acidic gas filter, and an embedded sensor.

FIG. 2D is a conceptual diagram illustrating an example system 250d including acidic gas filter 200 for filtering acidic contaminants from a gas and an embedded sensor 270d. In some examples, system 250d may include one or both of embedded sensor 270d and an embedded source 275d, that may be in contact with a surface of acidic gas filter 200. In some examples, one or both of an embedded sensor 270d and an embedded source 275d may be part of a PCB, an integrated circuit, or a chip.

Figure 3A:
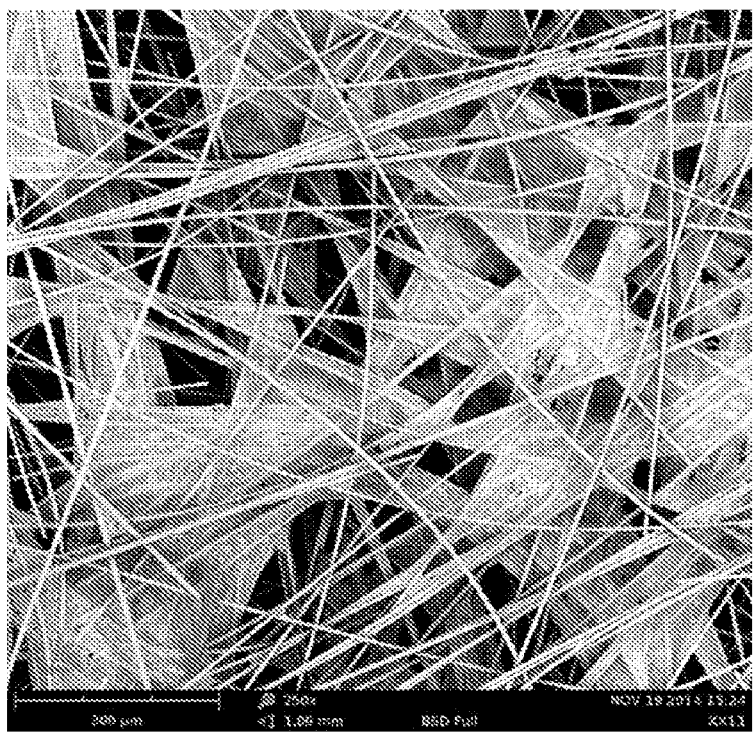
FIG. 3A is a scanning electron microscopy image of an example article including a coating applied to a glass fiber substrate.
Figure 3B:
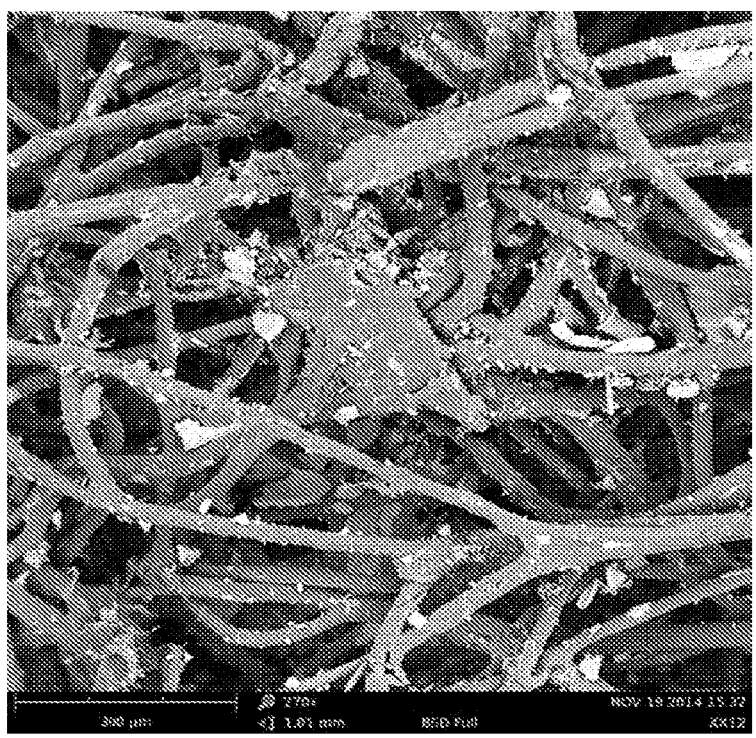
FIG. 3B is a scanning electron microscopy image of an example article including a coating applied to a polyester substrate.

FIG. 3A is a scanning electron microscopy image of an example article including a coating applied to a glass fiber substrate. FIG. 3B is a scanning electron microscopy image of an example article including a coating applied to a polyester substrate.

Thus, example articles and techniques according to the present disclosure provide filtration of acidic gas components from air.

The present disclosure will be illustrated by the following non-limiting examples

EXAMPLES

Example 1

Figure 4:
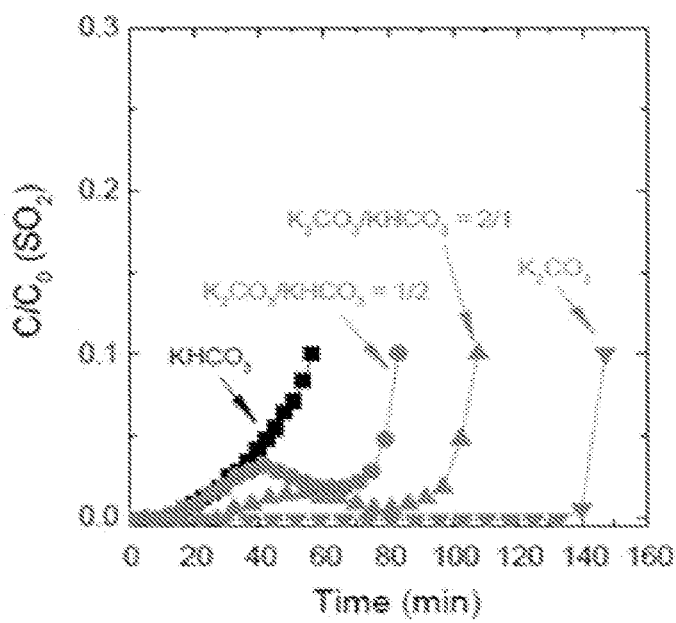
FIG. 4 is a chart illustrating the effect of different reactants in coating compositions on acidic gas filtration capacity.

$SO_2$ removal from air was carried out by a media developed by coating a composition including reactants on a fiber substrate. The effect of coating compositions on $SO_2$ removal performance was studied in the present example. Two performance of compositions including $K_2CO_3$ was compared with that of compositions including $KHCO_3$. Each sample had a weight composition of PAMPS-K (MW 5 million M):potassium iodide:potassium succinate:base in a weight ratio of 0.2:0.1:0.5:3 respectively. $K_2CO_3$ is more basic and may have a higher potential capacity than $KHCO_3$. Therefore it may be advantageous to use $K_2CO_3$ as the base or reactant. However, $K_2CO_3$ can gradually absorb $CO_2$ from the air and convert to $KHCO_3$. FIG. 4 is a chart illustrating the effect of the different reactants in coating compositions on acidic gas filtration capacity (removal of $SO_2$). The initial $SO_2$ concentration was $C_0$=30 ppm. Air flow rate was maintained at 2.6 L/min, and relative humidity was maintained a 50%. As shown in FIG. 4, $K_2CO_3$ resulted in a better capacity. Partial or total replacement with $KHCO_3$ decreased the capacity significantly. It is anticipated that carbonates would eventually be converted to bicarbonates upon uptake of $CO_2$.

Example 2

Figure 5:
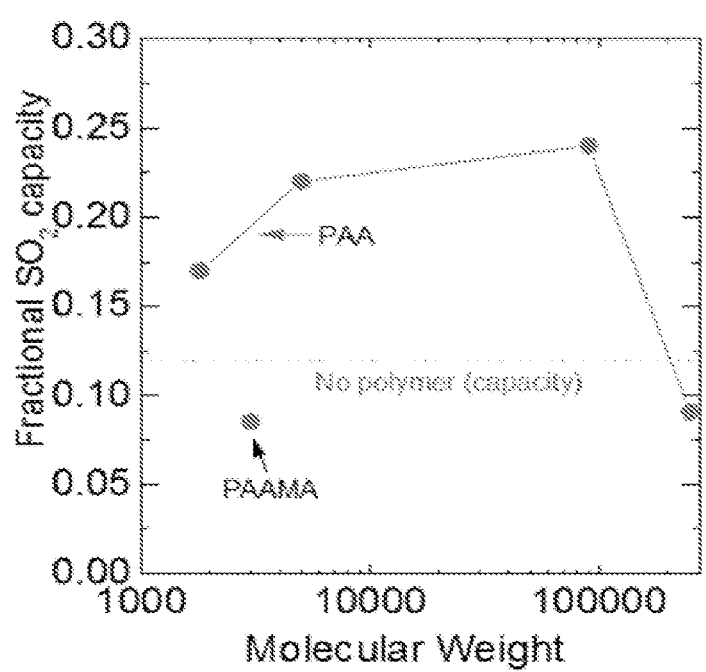
FIG. 5 is a chart illustrating the effect of different polymers in coating compositions on acidic gas filtration capacity and breakthrough pH as a function of molecular weight.

Polymers including polyacrylic acid (PAA), polymethacrylic acid (PMAA), poly(acrylic acid-co-maleic acid) (PAAMA), polyacrylamide (PAM), and poly(2-acrylamido-2-methylpropane sulfonic acid) (PAMPS) were evaluated for their effect on acid gas component removal. The PAA or PAAMA polymers were used to prepared fiber filters with the formula of PAAK (or PAAMAK)/IDAK/KHCO3 (0.2:1:4) wt % (K referring to potassium in this notation). The breakthrough pH and capacity of each sample are plotted in FIG. 5. FIG. 5 is a chart illustrating the effect of different polymers in coating compositions on acidic gas filtration capacity and breakthrough pH as a function of molecular weight. The sample with no PAAK showed very low capacity. With the same amount of PAAK added, the samples showed improved capacity. There was a strong correlation between the acidity of the polymer and the capacity. The less the acidity of the PAA, the better the capacity for $SO_2$ absorption. Without being bound by theory, this may be because with higher affinity with proton the —COO— anion is able to capture H+ faster at the gas/liquid interface. Then the formed —COOH may be still sufficiently strong to react with the carbonate/bicarbonate absorber. So the polymer may be able to increase the mass transfer within the sample. The PAAK-90k had the best performance. In addition, the breakthrough pH of each sample was strongly related to the sample capacity because a higher capacity typically resulted in a higher conversion of the absorber.

Figure 6:
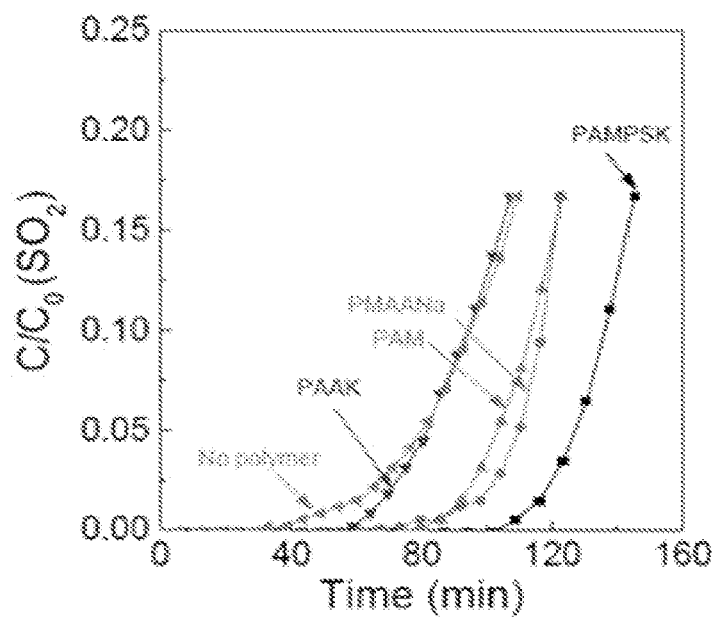
FIG. 6 is a chart illustrating the effect of different polymers in coating compositions on acidic gas filtration capacity as a function of time.

FIG. 6 is a chart illustrating the effect of different polymers in coating compositions on acidic gas filtration capacity as a function of time. As shown in FIG. 6, different polymers resulted in different breakthrough time. The sample capacity was enhanced by different polymers in the following order: PAMPS>PMAA>PAM>PAA>none. PMAA performed better than PAA, likely due to the even less acidity of PMAA than PAA. PAM has very high molecular weight of 5 to 6 million. It was difficult to dissolve in water and could easily form a gel. PAMPS had the best performance, as seen in FIG. 6. Without being bound by theory, PAMPS may act like a surfactant so that the $SO_2$ gas becomes more stable on dissolving in water. At the same time, the surface energy of the gas/liquid interface may be decreased resulting in easier dissolution of the gas molecule in the liquid phase.

Example 3

Figure 7:
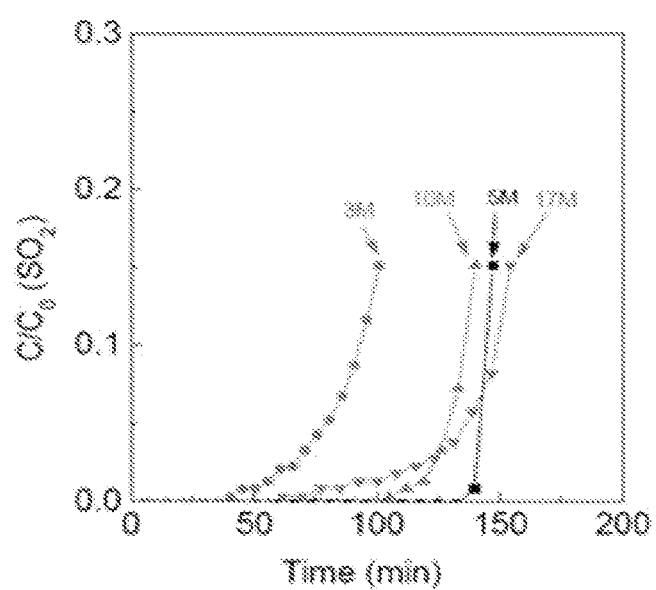
FIG. 7 is a chart illustrating the effect of molecular weight of poly (2-acrylamido-2-methyl-1-propanesulfonic acid) in coating compositions on acidic gas filtration capacity as a function of time.

The effect of the molecular weight of PAMPS on $SO_2$ removal was evaluated. FIG. 7 is a chart illustrating the effect of molecular weight of PAMPS in coating compositions on acidic gas filtration capacity as a function of time, or the breakthrough time. The initial $SO_2$ concentration was $C_0$=20 ppm. The flow rate of air was maintained at 2.6 L/min, and the relative humidity was 50%. PAMPS of molecular weight of 5 million gave a sharp breakthrough and long breakthrough time indicating that the sample had fast kinetic and high capacity. The much lower performance of the sample with PAMPS of molecular weight of 3 million was likely due to the uneven coating and large chunks or agglomeration within the fibers. With higher molecular weight, however, the reaction speed may be decreased due to the high viscosity of the coating liquid. Therefor the preferred molecular weight of the PAMPS for this was between 5 and 10 million.

Example 4

Figure 8:
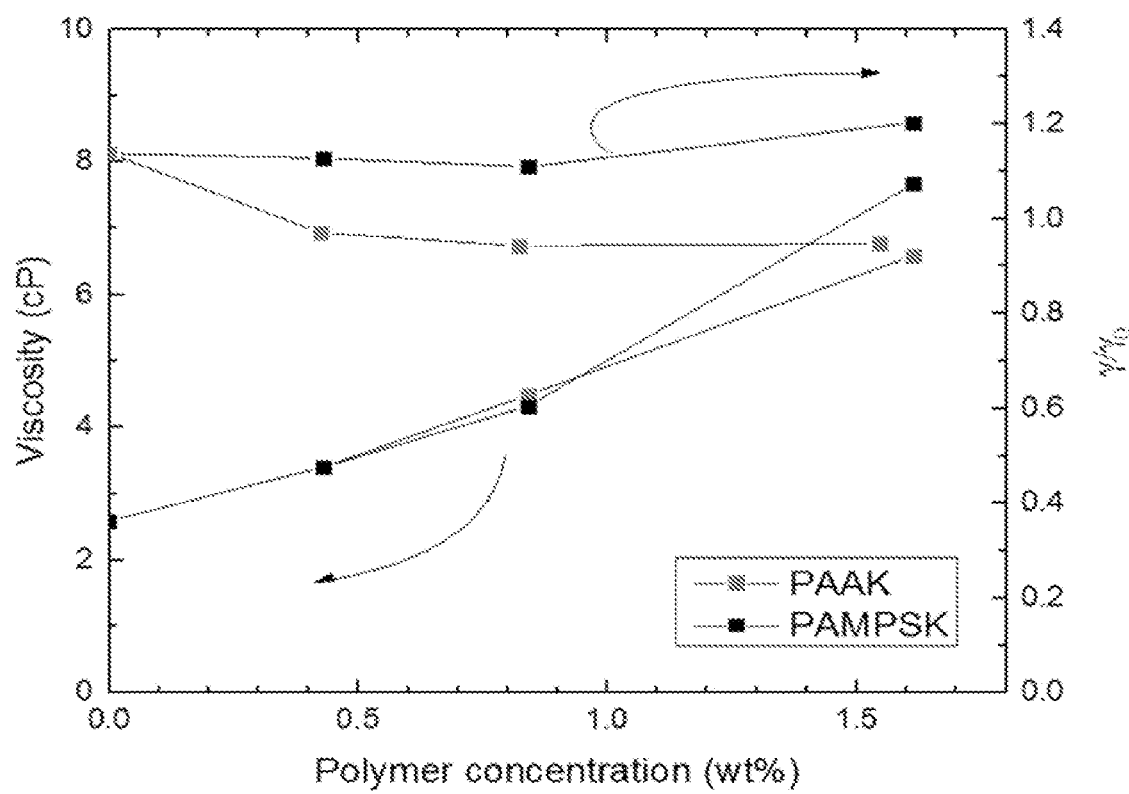
FIG. 8 is a chart illustrating the effect of polymer concentration on the viscosity and surface tension of coating compositions.

While PAA and PAMPS are preferred, the presence of polymer may affect viscosity and surface tension of the coating solutions. For large scale fiber manufacturing, high concentration coating solutions may be used to save energy for drying. The concentration of the polymer needs to be controlled so that the coating solutions have moderate viscosity and low surface tension. Therefore, the fiber substrate can get wet evenly and quickly. Solution viscosity surface tension was measured by Cannon-Fenske viscometer and a custom capillary surface tension apparatus. The test results are shown in FIG. 8. FIG. 8 is a chart illustrating the effect of polymer concentration on the viscosity and surface tension of coating compositions. Surface tension was relative to pure water (71.2 mN/m).

Example 5

Figure 9A:
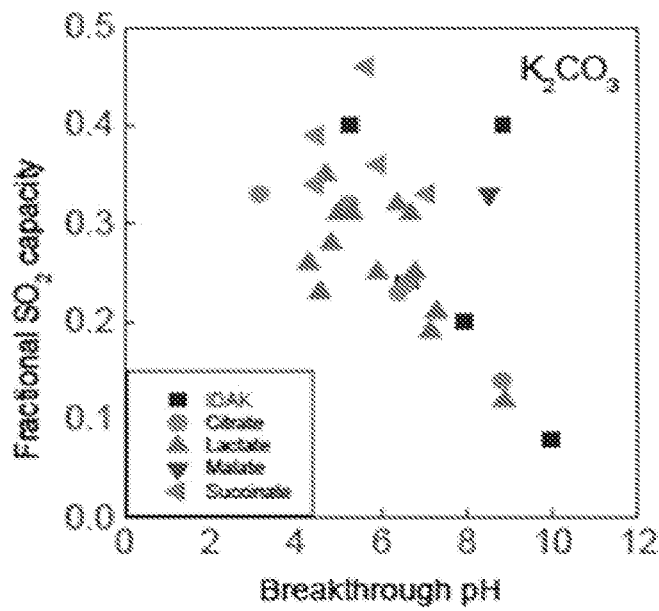
FIG. 9A is a chart illustrating the effect of different humectants on acidic gas filtration capacity and breakthrough pH of coating compositions including $K_2CO_3$.
Figure 9B:
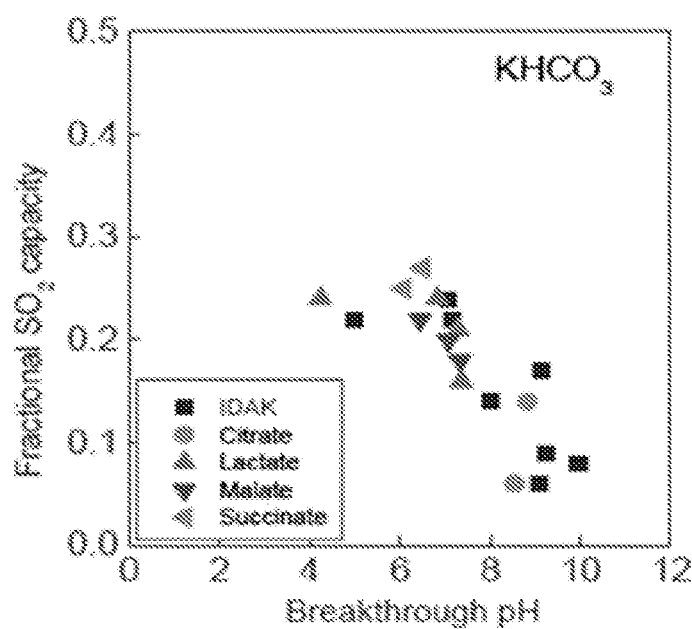
FIG. 9B is a chart illustrating the effect of different humectants on acidic gas filtration capacity and breakthrough pH of coating compositions including $KHCO_3$.
Figure 10:
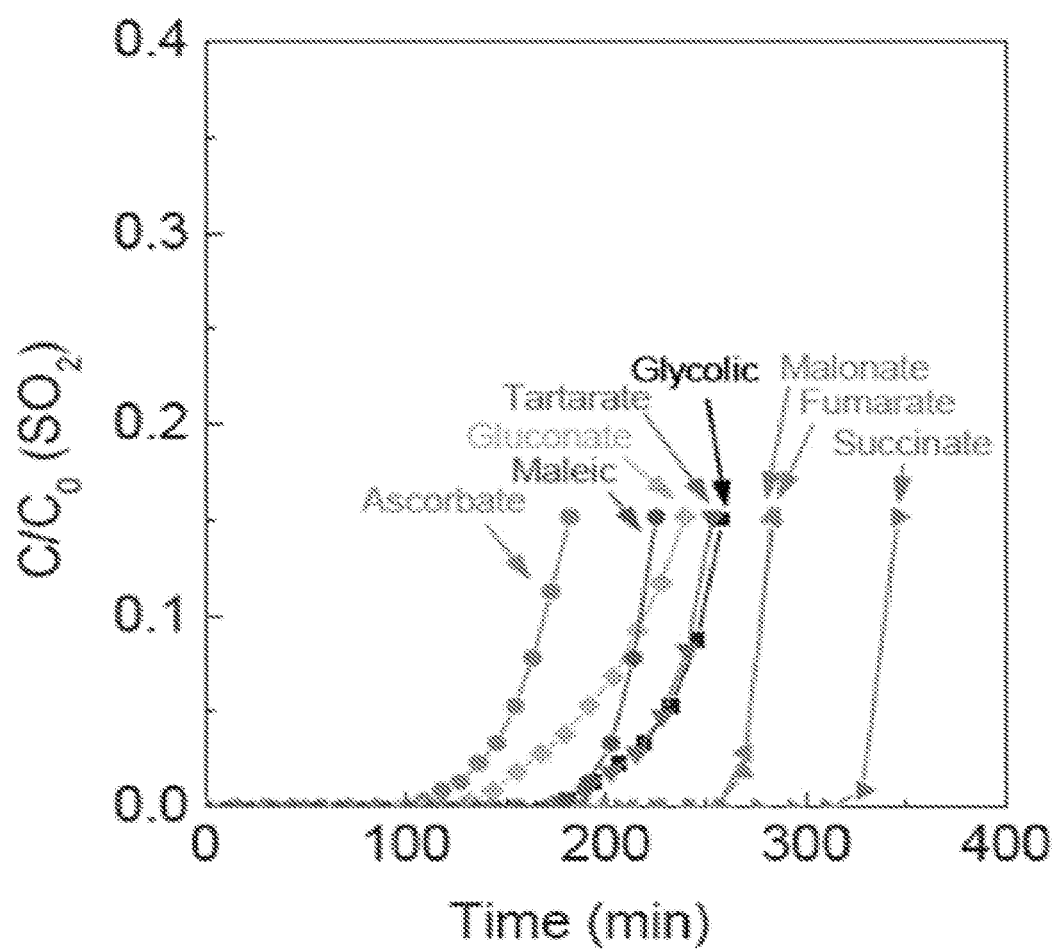
FIG. 10 is a chart illustrating the effect of different humectants on acidic gas filtration capacity and breakthrough pH of coating compositions.

The effect of humectant on acid gas component removal was evaluated. Several humectant substances were used in both the carbonate and bicarbonate systems, including acetic acid, formic acid, iminodiacetic acid (IDA), citric acid, lactic acid, malic acid, and succinic acid. The physical properties of these chemicals are summarized in Table 1. Among them, acetic acid was the best humectant so far because of its favorable pKa value, miscibility with water, and high diffusion rate in water. The acetic acid/acetate buffer may serve as a high efficient vehicle to continuously and effectively carry the proton from the gas/liquid interphase to the liquid/solid interface until the carbonate/bicarbonate was completely converted. With potassium acetate as the humectant, the conversion degree could possibly reach 100%. However, acetic acid is volatile. So it cannot be used in this application because acetic acid may be released from the sample once breaking through at low pH. The formic acid has the same problem. From this point of view, only the organic acids with very low vapor pressure were selected as the humectant additives. Other organic acids listed in Table 1 have various solubility and pKa values. Their effects on sample performance were tested and results are shown in FIGS. 9A and 9B. FIG. 9A is a chart illustrating the effect of different humectants on acidic gas filtration capacity and breakthrough pH of coating compositions including $K_2CO_3$. FIG. 9B is a chart illustrating the effect of different humectants (IDAK, citrate, lactate, malate, succinate) on acidic gas filtration capacity and breakthrough pH of coating compositions including $KHCO_3$. FIG. 10 is a chart illustrating the effect of additional different humectants (ascorbate, maleic acid, gluconate, tartarate, glycolic acid, malonate, fumarate, and succinate) on acidic gas filtration capacity and breakthrough pH of coating compositions. The initial $SO_2$ concentration was $C_0$=20 ppm. The flow rate of air was maintained at 2.6 L/min, and the relative humidity was 50%. Succinate was found to have the best performance.

TABLE 1

| Acid | Melting Point (° C.) | Vapor Pressure (Pa) | Miscibility (/100 mL water) | pKa |
|---|---|---|---|---|
| Acetic | 16 | 15.8 | miscible | 4.76 |
| Formic | 8.4 | 40 | miscible | 3.77 |
| Iminodiacetic | 243 | — | 2.43 g | 2.98, 9.89 |
| Lactic | 16.8 | 0.0813 | miscible | 3.86 |
| Malic | 130 | 0.0009 | 55.8 g | 3.40, 5, 20 |
| Citric | 156 | $10^{-7}$ | 147.76 g | 3.13, 4.76, 6.4 |
| Succinic | 184 | $10^{-5}$ | 5.8 g | 4.2, 5.6 |

Example 6

Figure 11A:
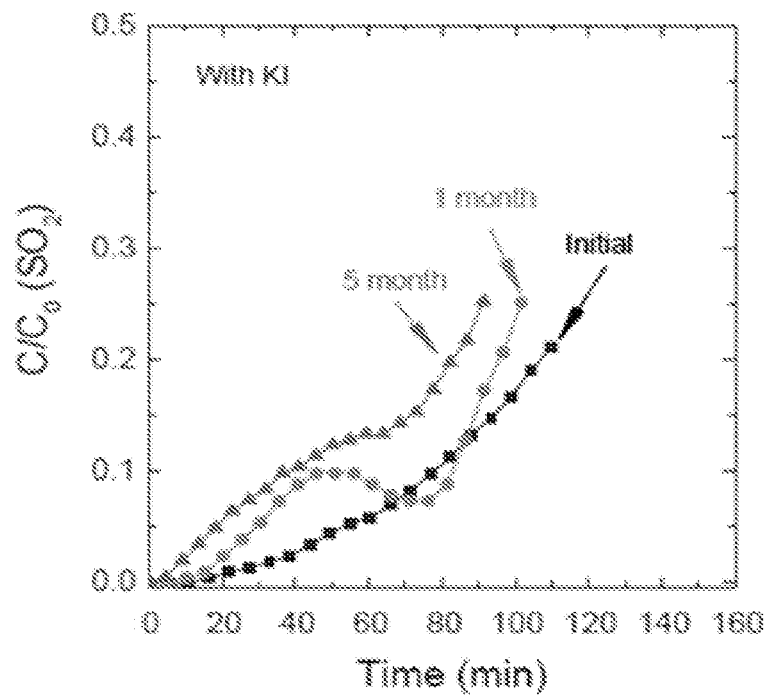
FIG. 11A is a chart illustrating the effect of aging on acid capture capacity of coating compositions including a preservative.
Figure 11B:
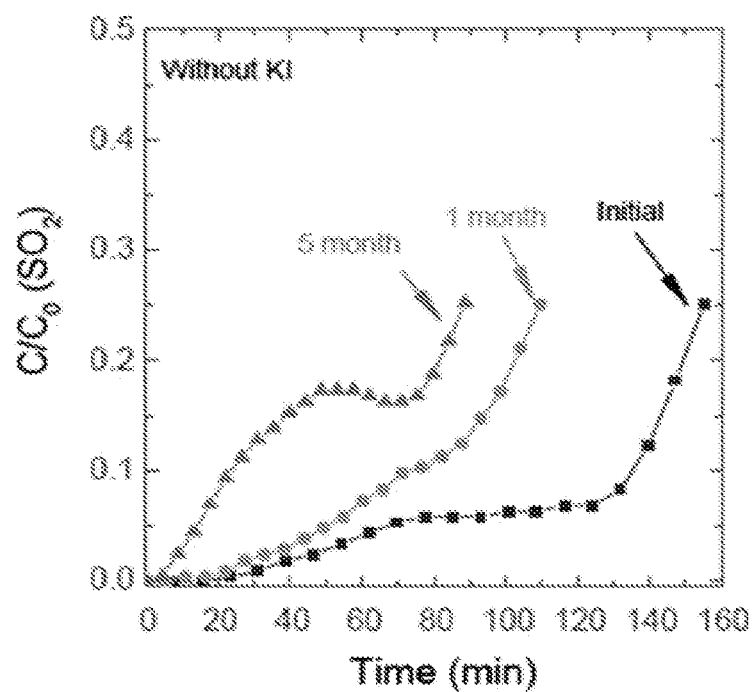
FIG. 11B is a chart illustrating the effect of aging on acid capture capacity of coating compositions that do not include a preservative.

The effect of preservative on the acid gas component removal capacity after aging was evaluated. Potassium iodide (KI) was used as a preservative. FIG. 11A is a chart illustrating the effect of aging on acid capture capacity of coating compositions including a preservative. FIG. 11B is a chart illustrating the effect of aging on acid capture capacity of coating compositions that do not include a preservative. FIGS. 11A and 11B show the change of sorption performance of the media within 5 months of exposure to ambient conditions. The sample without KI had a composition of PAMPS (MW: 5 million)/potassium succinate/$K_2CO_3$ (0.4:0.7:3). The one containing KI had a composition of PAMPS (MW: 5 million)/KI/potassium succinate/$K_2CO_3$ (0.4:0.1:0.7:3). The samples with and without KI had initial capacities of 0.150 and 0.192 g $SO_2$/g fiber, respectively. This was because KI had no capacity to absorb $SO_2$. The presence of KI could also make the fiber less hygroscopic. After 1 month of exposure, the samples with and without KI decreased the capacities to 0.124 and 0.132 g $SO_2$/g fiber, respectively, corresponding to 17.3% and 31.3% of decrease. After 5 month of exposure, the samples with and without KI further decreased the capacities to 0.100 and 0.095 g $SO_2$/g fiber, respectively, corresponding to 33.3% and 50.5% of decrease. These results indicate that the sample containing KI was able to slow down the ageing of the samples likely due to the preservative effect of KI.

Example 7

Figure 12:
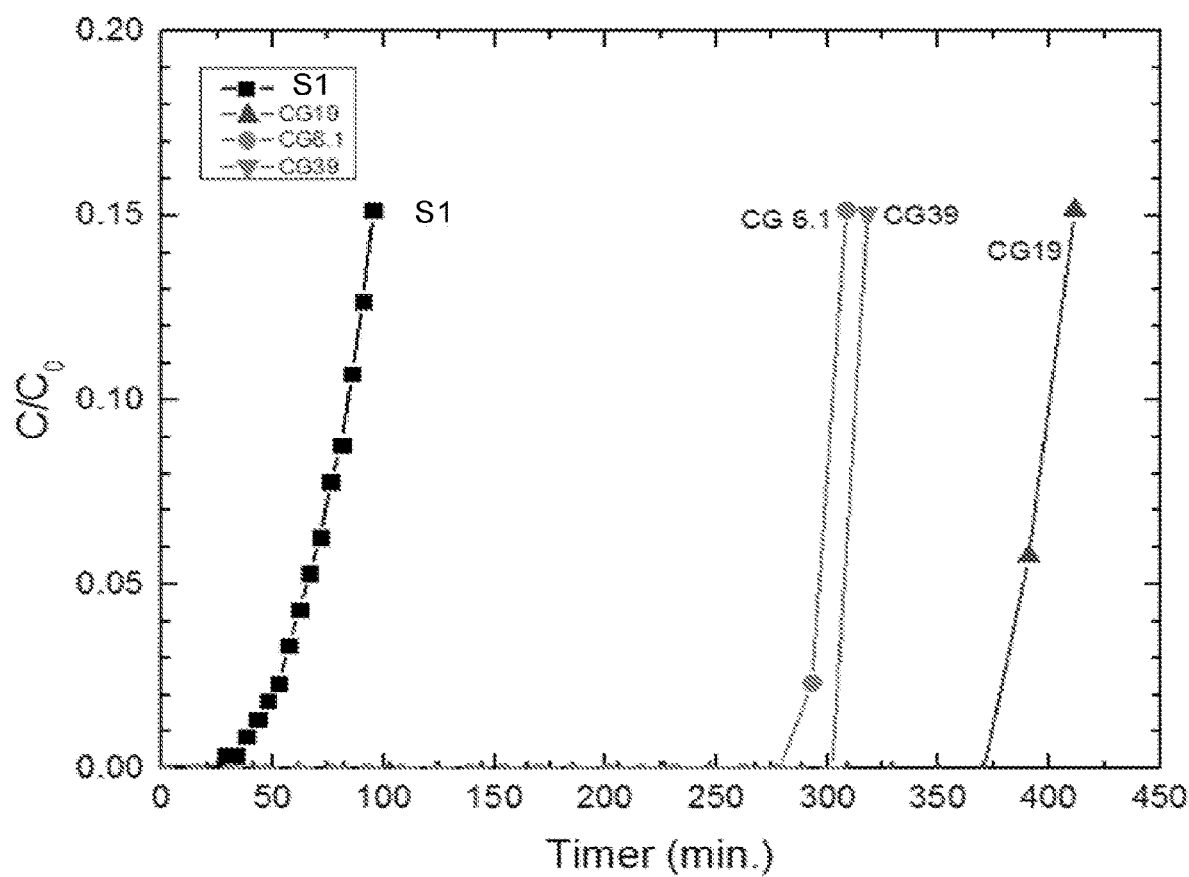
FIG. 12 is a chart illustrating the effect of different substrates on acid capture capacity.

The effect of different substrates on acid gas component removal was evaluated. Different substrates were also used for $SO_2$ removal filters. FIG. 12 is a chart illustrating the effect of different substrates on acid capture capacity, or the breakthrough curves of samples applied to different substrates. The initial $SO_2$ concentration was $C_0$=20 ppm. The flow rate of air was maintained at 2.6 L/min, and the relative humidity was 50%. As seen in FIG. 12, glass fibers had similar performance while sample S1 (including a thermally carded polyester/polyethylene bicomponent fiber web) had significantly lower performance. The substrate S1 is made of polyester fiber with large diameter and hydrophobic surface. So coating materials may form large chunks or agglomerates within the voids instead of forming an even coating on the fiber surface. The poor morphology may result in low reaction speed and capacity. Therefore, certain surface modification to improving the surface hydrophilicity of S1 may improve its performance for $SO_2$ removal.

Example 8

The effect of water, moisture, or humidity on performance of acid gas component removal coatings was evaluated. While water may enhance adsorption, it may cause drifting of the coating materials, resulting in handling and storage problems and decrease in absorption performance. In order to improve the drifting stability of the coating materials at high humidity, several strategies may be considered to modify the properties of the coating layer, including 1) increasing the concentration and/or the molecular weight of the polymer, 2) the use of less soluble base materials such as $Na_2CO_3$, 3) the use of multivalent cations to induce ionic cross-linking, 4) and the use of cross-linkable polymers. The effect of each method was evaluated by measuring the weight loss after putting the samples in a desiccator with predetermined relative humidity. A saturated sodium chloride solution and pure water were used to get relative humidity of 75% and 100%, respectively. The drifting tests were performed at room temperature for 48 hours. A certain amount of the coating materials drifted out of the samples. Then the samples were dried at 80° C. for 30 min and weight loss was calculated. The target was to minimize the weight loss at high humidity while maintaining high absorption performance. Table 2 shows the drifting results of each modifying method.

Sample SX-0 was the original sample with the coating composition of PAWS (MW: 10 million)/potassium iodide/potassium succinate/$K_2CO_3$ (0.4:0.1:0.7:3). It exhibited weight losses of 30.8% and 47.4% at 75% and 100% relative humidity respectively. The absorption capacity was tested at 50% relative humidity, 20 ppm $SO_2$ concentration, and 2.6 L/min flow rate. Based on coating weight, the SX-0 had a capacity of 0.33 g S02/g. From SX-1 to SX-3, increasing concentration of PAMPS or higher molecular weight was used. The weight losses slightly decreased; indicating that higher viscosity of the coating solution could alleviate the coating drifting. However, the polymer could not completely stop the drifting because of its high solubility in water. The partial replacement of $K_2CO_3$ by $Na_2CO_3$ (SX-4) could also help to alleviate the drifting because $Na_2CO_3$ has a much higher critical relative humidity (92%) than $K_2CO_3$ (43%). Due to the poor absorption capacity, this approach could not be accepted. Divalent cations such as $Ca^{2+}$, $Ba^{2+}$, $Mg^{2+}$, and $Zn^{2+}$ have shown a high capability to stop drifting (SX-5-SX-9). They almost completely stopped drifting at 75% RH. This may be because of the formation of ionic cross-linking between polymer chains and the formation of small carbonate particles. These particles could form relatively stable suspension in the solution. Upon drying, these particles may coalesce and form reinforced composite. In particular, $MgCl_2$ and $ZnCl_2$ performed well at 100% RH. $ZnCl_2$ was able to form stable suspension in the solution when adding $ZnCl_2$ dilute solution in the rest of mixture solution. Colloidal silica (LUDOX® AM) can be used as well due to the same mechanism.

TABLE 2

| Sample | Method | 75% RH Weight loss (%) | 100% RH Weight loss (%) | Capacity (g $SO_2$/g coating material) |
|---|---|---|---|---|
| SX-0 | — | 30.8% | 47.4% | 0.33 |
| SX-1 | 1.5x PAMPS (MW: 10 million) | 22.8% | 40.6% | 0.31 |
| SX-2 | 2x PAMPS (MW: 10 million) | 24.7% | 38.2% | — |
| SX-3 | 1x PAMPS (MW: 20 million) | 21.3% | 31.5% | — |
| SX-4 | KNaCO3 | 10.2% | 31.2% | 0.07 |
| SX-5 | Ca(OH)$_2$ (6% of coating) | 0.00% | 19.2% | 0.09 |
| SX-6 | CaCl$_2$ (13% of coating) | 6.45% | 29.3% | 0.25 |
| SX-7 | Ba(OH)$_2$ (17% of coating) | 0.00% | 27.3% | 0.27 |
| SX-8 | MgCl$_2$ (17% of coating) | 2.70% | 7.89% | — |
| SX-9 | ZnCl$_2$ (17% of coating) | −2.78% | 7.58% | — |
| SX-10 | SiO$_2$ (17% of coating) | −2.22% | 10.5% | — |
| SX-11 | CG39/PAA | −0.90% | −1.08% | — |
| SX-12 | S1/PAA | 5.56% | 29.7% | — |
| SX-13 | PDAAM-co-PAMPS cross-linked by ADH | −2.08% | 4.17% | — |

Example 9

The effect of cross-linkable polymers on drifting was evaluated. Cross-linkable polymers may significantly reduce or prevent drifting. Polyacrylic acid (PAA) was mixed with glycerol and NaH$_2$PO$_4$ in water to form a coating solution (PAA:glycerol:NaH$_2$PO$_4$=1:0.1:0.3 weight ratio), which was coated onto fiber substrates like glass fiber and S1. The coating layer became cross-linked upon heating at 170° C. for 10 min. This cross-linked PAA can form stable hydrogel after absorbing water. Therefore, the coating materials were not able to flow out of the hydrogel layer. No drifting was observed even at 100% RH (SX-11). However, since PAA cross-linking happens at high temperature, this method did not work well for polymer substrate S1. The S1 substrate became soft and generated a strong plastic odor.

Ideally, the coating solution should be stable and storable for a fairly long time. During or after coating onto the substrate, the cross-linking may be triggered by mild conditions including pH adjustment (acid or base), drying, relatively low temperature and UV. The polymers may include functional groups like epoxy, amines, vinyl, ketone, aldehyde etc. A reaction between diacetone acrylamide (DAAM) and adipic dihydrazide (ADH) to form Schiff base may be used. Both chemicals are non-toxic and the reaction only has water as by-product. In addition, the cross-linking reaction may be activated during drying. Since poly(diacetone acrylamide) is not water soluble, a copolymer of diacetone acrylamide and 2-acrylamido-2-methylpropane sulfonic acid (PDAAM/PAMPS) with 1:1 molar ratio was synthesized. This copolymer was used to replace PAMPS and it worked together with ADH to form hydrogel during the manufacturing of the base media. It was observed that the coating solution maintained homogeneous. After coating and drying, due to the high temperature and concentration, the polymer became cross-linked and effectively stopped drifting even at 100% RH.

The copolymer PDAAM/PAMPS may form stable cross-linking structure with PNHMA at elevated temperature. Depending on the cross-linking degree, the formed hydrogel had different stability and water uptake. It was observed that with a cross-linking degree of 33%, the samples prepared with K$_2$CO$_3$ or KHCO$_3$ showed very good stability of coating materials at both 75% and 100% relative humidity. Almost no weight loss was observed for a week. However, sample capacity was decreased somewhat, likely due to the enhanced difficulty for the gas molecule to diffuse into the gel.

Example 10

Figure 13A:
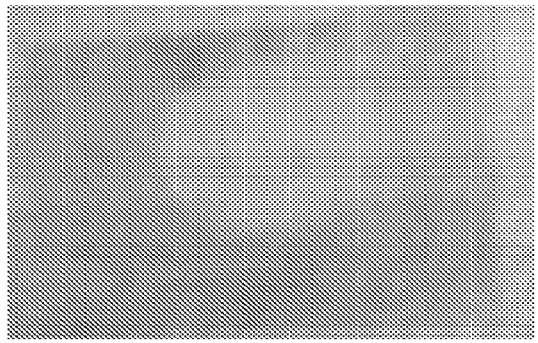
FIGS. 13A-13E are photographs of regions of a coated substrate including pH indicators indicating filtration status.
Figure 13B:
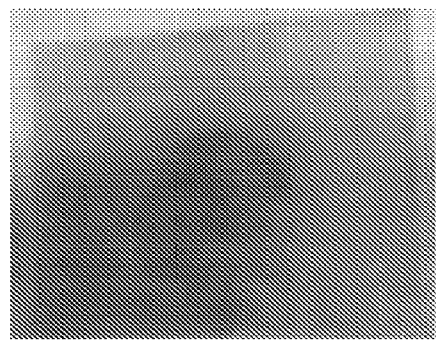
Figure 13C:
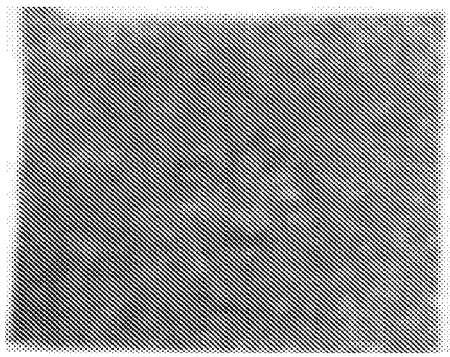
Figure 13D:
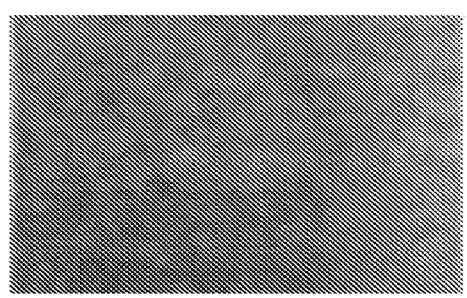
Figure 13E:
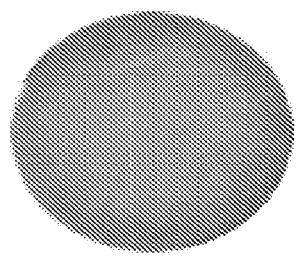

The use of pH indicators for indicating the state of the acid gas removal coating was evaluated. Because of the significant change in pH during SO$_2$ absorption, it is possible to use a pH indicator to determine the breakthrough of the fiber. A desired pH indicator may have a stable and bright color during storing and a sharp and apparent color change at breakthrough. In addition, the indicator should preferably have no negative effect on filter performance. The pH indicators used in this study included bromothymol blue, neutral red, phenol red, and bromocresol purple. They were selected because they can change color at about neutral pH. The samples were prepared by adding about 0.3% of indicator to the coating mixture. The fiber was then exposed to HCl vapor to initiate the pH and color change. FIGS. 13A-13E are photographs of regions of a coated substrate including pH indicators indicating filtration status. FIGS. 13A-13D show some results of color change with different indicators. It is preferable to have an initial blue color since blue is conventionally associated with basic pH. At breakthrough, the color should change to yellow or red, so that the contrast is sharp. Bromothymol blue is preferred for these characteristics. FIG. 13E illustrates the sample color change after breakthrough, in contrast with unreacted edges.

Example 11

For applications at high relative humidity of >90%, drifting of the coating materials may pose a serious problem due to several reasons. Firstly, polyester substrate is hydrophobic. The coating materials cannot spread very well on the surface of the fibers. Secondly, potassium carbonate (K$_2$CO$_3$) is a strong humectant and has a low critical relative humidity of 43%. It tends to draw water from moisture air at relative humidity of >43%. Thirdly, K$_2$CO$_3$ has a relatively low solubility (112 g/100 mL at 20° C.). When converted to KHCO$_3$ by absorbing CO$_2$, the solubility is even lower (33.7 g/100 mL at 20° C.). Therefore, when drying the solution, K$_2$CO$_3$ may precipitate out from the polymer solution. When water-soluble polymer stabilizer was used, K$_2$CO$_3$ phase always formed separately. At humid conditions, the K$_2$CO$_3$ phase would dissolve and drift.

To solve this problem, a strong gel may be used to stabilize the coating layer. Potassium alginate is soluble in water. It can form a water insoluble strong gel with multivalent cations such as calcium chloride because of the carboxylic groups. The effect of different cross-linking methods is shown in Table 3. The formula of SX-14 was PAM:PAMPS 2:1/alginate/CaCl$_2$/HEDP-K$_3$/K$_2$CO$_3$ (0.6:0.2:0.2:0.4:2.6). PAM-PAMPS 2:1 was used to increase viscosity of the solution and stabilize the suspension. HEDP was neutralized by KOH and used as antiscalant to decrease the particle size. Both the polymer and antiscalant worked together to make a coating suspension which could be stable for several days to several weeks. K$_2$CO$_3$ was used as the base to absorb acid gases. Different ratios of alginate and CaCl$_2$ and ZnCl$_2$ were studied. As shown in Table 3, all samples showed very low drifting at 100% humidity (<5%). Sample SX-16 had double amounts of alginate and CaCl$_2$ than SX-14. It had the lower weight loss than SX-14. The sample had visually even coating after putting in a 100% relative humidity chamber for 3 days. Therefore, this formulation was effective for drifting prevention. $ZnCl_2$ was also tested. It was found to not be as effective as $CaCl_2$.

TABLE 3

| Sample | Cross-linking method | Weight loss at 100% RH |
| --- | --- | --- |
| SX-14 | Alginate/$CaCl_2$ (1:1) | 4.69% |
| SX-15 | Alginate/$CaCl_2$ (1:2) | 4.29% |
| SX-16 | Alginate/$CaCl_2$ (2:2) | 1.07% |
| SX-17 | Alginate/$CaCl_2$ (2:1) | 4.95% |
| SX-18 | Alginate/$ZnCl_2$ (2:2) | 4.01% |
| SX-19 | Alginate/$ZnCl_2$ (2:1) | 4.44% |

Figure 14:
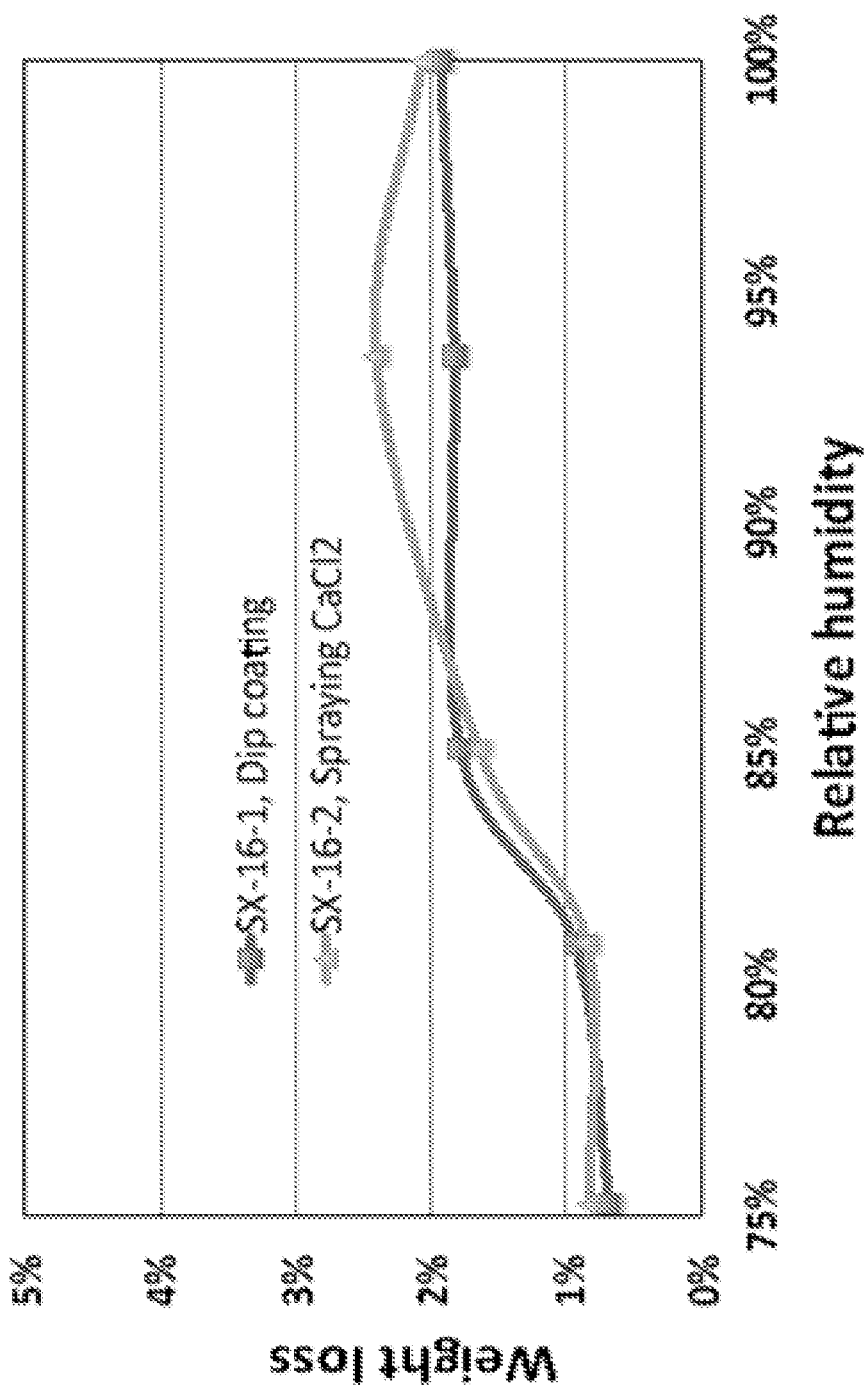
FIG. 14 is a chart illustrating the anti-drifting performance (weight loss as a function of relative humidity) for sample coating compositions.

Instead of forming a suspension solution, the cross-linker can also be sprayed onto an alginate containing media. Two samples were prepared using the formulation of SX-16. As shown in FIG. 14, both samples showed similar anti-drifting performance; no significant weight loss was observed after a week of test at 100% relative humidity. However, as shown in Table 4, the sample made from spraying of $CaCl_2$ showed much lower capacity. This is because the formation of gel on media surface could decrease the diffusion of acid gas inward.

TABLE 4

| Sample | Preparation method | Capacity (mg/g) |
| --- | --- | --- |
| SX-16-1 | Adding $CaCl_2$ to the coating solution to form a suspension | 132 |
| SX-16-2 | Spraying $CaCl_2$ to the alginate-containing media | 59 |

Test conditions:
50% relative humidity;
2.6 L/min;
30 ppm $SO_2$

Figure 15:
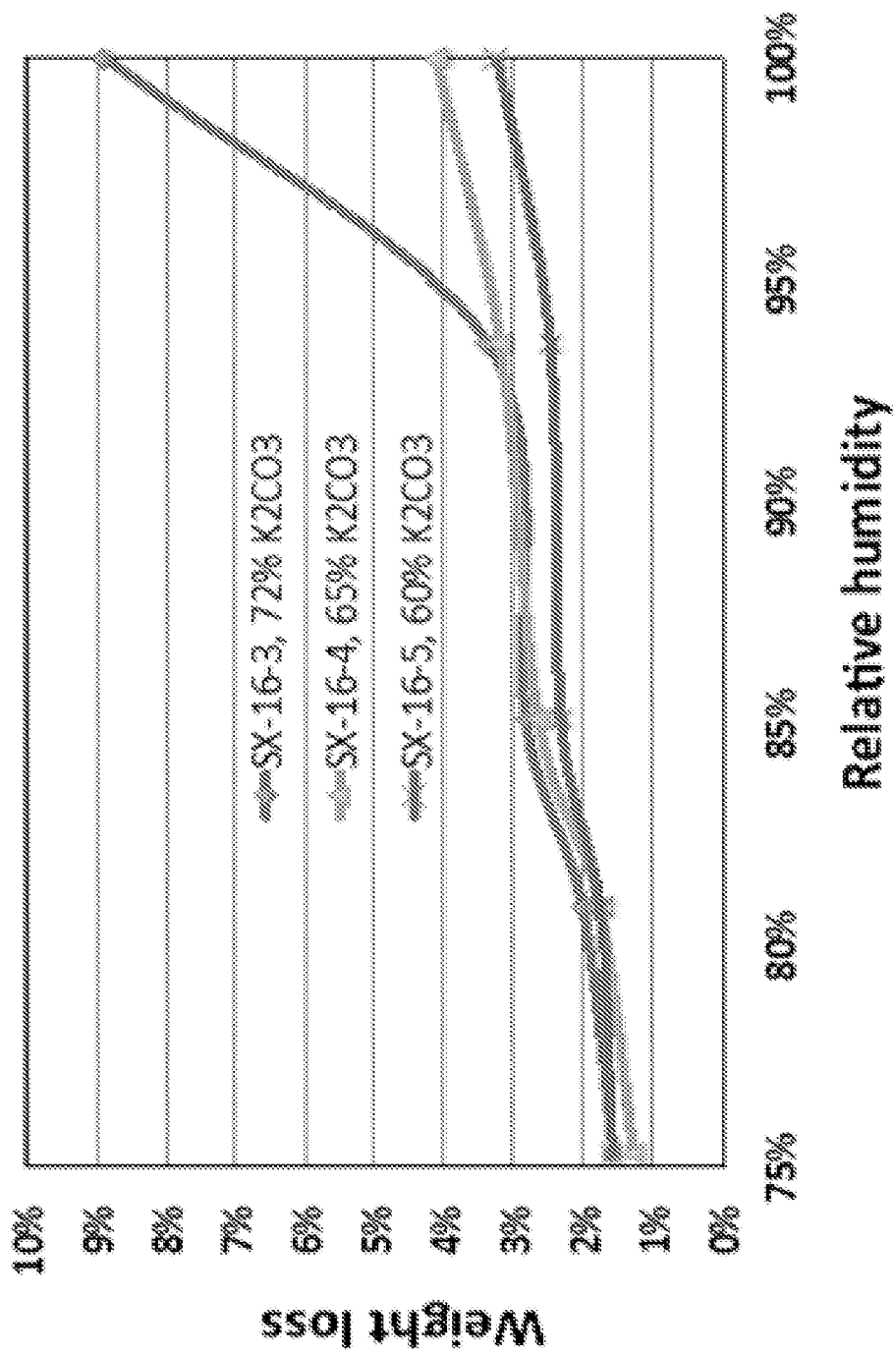
FIG. 15 is a chart illustrating the anti-drifting performance (weight loss as a function of relative humidity) for sample coating compositions.

Based on the same cross-linking method as SX-16, different amounts of potassium carbonate were added to the solution. The effect of $K_2CO_3$ concentration on $SO_2$ absorption performance is shown in Table 5 and FIG. 15. The lower amount of $K_2CO_3$ improved the anti-drifting performance. However, the capacity reduced. It was found that 65% of $K_2CO_3$ could provide optimal performance in terms of both capacity and anti-drifting capability.

TABLE 5

| Sample | % $K_2CO_3$ | Capacity (mg/g) |
| --- | --- | --- |
| SX-16-3 | 72% | 153 |
| SX-16-4 | 65% | 132 |
| SX-16-5 | 60% | 97 |

Test conditions:
50% relative humidity;
2.6 L/min;
30 ppm $SO_2$

Example 12

The use of inorganic particles as stabilizer for the coating solutions was evaluated. Sodium or calcium bentonite powder was added to the coating solution. The weight content of the inorganic particles in the solid coating materials was controlled to be between 5 and 20%. The coating solution was prepared by first mixing PAMPS-K:potassium succinate:$K_2CO_3$:phenol red in a weight ratio of 0.5:0.7:3:0.008 with water to make a 15% solution. Various amounts of sodium or calcium bentonite were added to form a stable suspension. After coating onto a nonwoven polyester substrate, the samples were placed in a 100% relative humidity chamber. Only slight drifting was observed with 5% of bentonites added. The sample with 20% bentonites showed little drifting although the samples were still wet. When $KHCO_3$ was used instead of $K_2CO_3$, the sample with 20% bentonites became even more stable because $KHCO_3$ absorbs less moisture than $K_2CO_3$. The samples showed no drifting, and very little material adhered to a probe when the probe contacted the media. Without being bound by theory, this may be because the bentonites formed strong gel within the coating and significantly increased the viscosity. The result indicated the effectiveness of bentonites to stabilize the coating materials.

Various examples of the invention have been described. These and other examples are within the scope of the following claims.

What is claimed is:

1. An article comprising an acidic gas heating, ventilation, and air conditioning (HVAC) filter configured to filter acidic components from a gas, the acidic gas HVAC filter comprising:
   a substrate;
   a coating applied to the substrate, wherein the coating comprises a basic reactant and a humectant, wherein the basic reactant comprises at least one of $K_2CO_3$, $Na_2CO_3$, $KHCO_3$, $NaHCO_3$, NaOH, and KOH; and
   a stabilizer, wherein the stabilizer comprises a water-soluble polymer, and wherein the water-soluble polymer comprises poly(2-acrylamido-2-methyl-1-propanesulfonic acid) (PAMPS).

2. The article of claim 1, wherein the humectant is present in a weight ratio of about 1:20 to about 1:1 with respect to the basic reactant.

3. The article of claim 1, wherein the humectant comprises at least one salt comprising a sodium, potassium, or cesium salt of formate, acetate, nitrite, citrate, succinate, fluoride, glycolate, ascorbate, malonate, tartarate, gluconate, fumarate, sorbate, lactate, iminodiacetate, or malate.

4. The article of claim 1, wherein the coating comprises potassium succinate.

5. The article of claim 4, wherein the coating further comprises a preservative.

6. The article of claim 5, wherein the preservative is present in a weight ratio of about 1:5000 to about 1:10 with respect to the basic reactant.

7. The article of claim 5, wherein the preservative comprises at least one of potassium iodide, potassium nitrite, polyols, parabens, dehydroacetic acid, dehydroacetate salts, and benzoates.

8. The article of claim 5, wherein the preservative comprises dehydroacetic acid.

9. The article of claim 1, wherein the water-soluble polymer is present in a concentration between about 0.2 and about 20% by weight with respect to the coating.

10. The article of claim 1, wherein the water-soluble polymer further comprises at least one of metal polyacrylates, polyvinyl alcohol (PVA), polyacrylamide (PAM), poly (ethylene glycol) (PEG), polydiallyldimethylammonium chloride (PDADMAC), polymaleic acid, polyethylenimine (PEI), ethoxylated polyethylenimine (EPEI), poly(N-hydroxyethyl acrylamide) (PNHEA), and copolymers thereof.

11. The article of claim 9, wherein the water-soluble polymer has a molecular weight between about 5 million and about 10 million.

12. The article of claim 1, wherein the coating further comprises a pH indicator.

13. The article of claim 12, wherein the pH indicator comprises at least one of neutral red, phenol red, nitrazine yellow, bromophenol red, cresolphenol red, and brilliant yellow.

14. The article of claim 12, wherein the pH indicator comprises one or both of phenol red or nitrazine yellow.

15. The article of claim 1, wherein the substrate comprises a fibrous substrate.

16. The article of claim 1, wherein the coating at least partly impregnates a surface of the substrate.

17. The article of claim 1, wherein the stabilizer further comprises an inorganic stabilizer.

18. The article of claim 17, wherein the inorganic stabilizer comprises one or more of clay, nanoclay, bentonite, montmorillonite, or colloidal silica.

19. An article comprising an acidic gas heating, ventilation, and air conditioning (HVAC) filter configured to filter acidic gas components from a gas, the acidic gas HVAC filter comprising:
a fibrous substrate; and
a coating applied to the fibrous substrate, wherein the coating comprises:
a cross-linkable polymer and a cross-linker that form an ionic gel, poly(2-acrylamido-2-methyl-1-propanesulfonic acid) (PAMPS), and a basic reactant.

20. The article of claim 19, the coating further comprising at least one of potassium succinate and dehydroacetic acid.

21. The article of claim 19, the coating further comprising a color changing dye comprising one or more of neutral red, phenol red, nitrazine yellow, bromophenol red, cresolphenol red, and brilliant yellow.

22. The article of claim 19, wherein the cross-linkable polymer comprises alginate, and wherein the cross-linker comprises a calcium salt.

23. A system comprising:
an acidic gas heating, ventilation, and air conditioning (HVAC) filter comprising:
a coating on a substrate, wherein the coating comprises a basic reactant and a humectant, wherein the basic reactant comprises at least one of $K_2CO_3$, $Na_2CO_3$, $KHCO_3$, $NaHCO_3$, NaOH, and KOH, and
a stabilizer, wherein the stabilizer comprises a water-soluble polymer, and wherein the water-soluble polymer comprises poly(2-acrylamido-2-methyl-1-propanesulfonic acid) (PAMPS); and
a sensor configured to sense an optical change in the coating and generate a signal indicative of the optical change.

24. The system of claim 23, wherein the coating comprises a dye, and wherein the optical change is a change in a color of the dye.

25. The system of claim 24, wherein the dye comprises a pH indicator.

* * * * *